United States Patent Office.

GEORGE LA MONTAGUE, OF MUSKEGON, MICHIGAN.

Letters Patent No. 107,066, dated September 6, 1870.

IMPROVEMENT IN PECTORAL SIRUP OR MEDICINE.

The Schedule referred to in these Letters Patent and making part of the same.

I, GEORGE LA MONTAGUE, of the city of Muskegon and State of Michigan, physician and surgeon, have invented a new Pectoral Sirup.

The nature of my invention consists in mixing together acetate of morphine, tartrate of antimony and potash, essence of bitter almonds, tincture of ipecacuanha, wine of squills, and simple sirup.

To prepare my pectoral sirup, for instance, one pint of it, or a little over, I take twelve (12) grains of acetate of morphine, five (5) grains of tartrate of antimony and potash, one ounce of tincture of ipecacuanha, one ounce and a half of wine of squills, one dram of essence of bitter almonds, and one pint of simple sirup, and mix these ingredients all together.

The sirup is then ready for use, and give to an adult, for instance, at the dose of twenty-five to forty drops, according to the case.

Claim.

I claim as my invention—

The manufacture or preparation of a compound, which is denominated "Dr. G. La Montague's New Pectoral Sirup," consisting of the ingredients, in the proportions, and for the purposes set forth.

Muskegon, Mich., July 5, 1870.

GEO. LA MONTAGUE.

Witnesses:
G. TALBOT,
SIMEON LAROCHELLE.